(No Model.) 2 Sheets—Sheet 1.
W. SNOW.
SWINGING GATE.
No. 467,443. Patented Jan. 19, 1892.
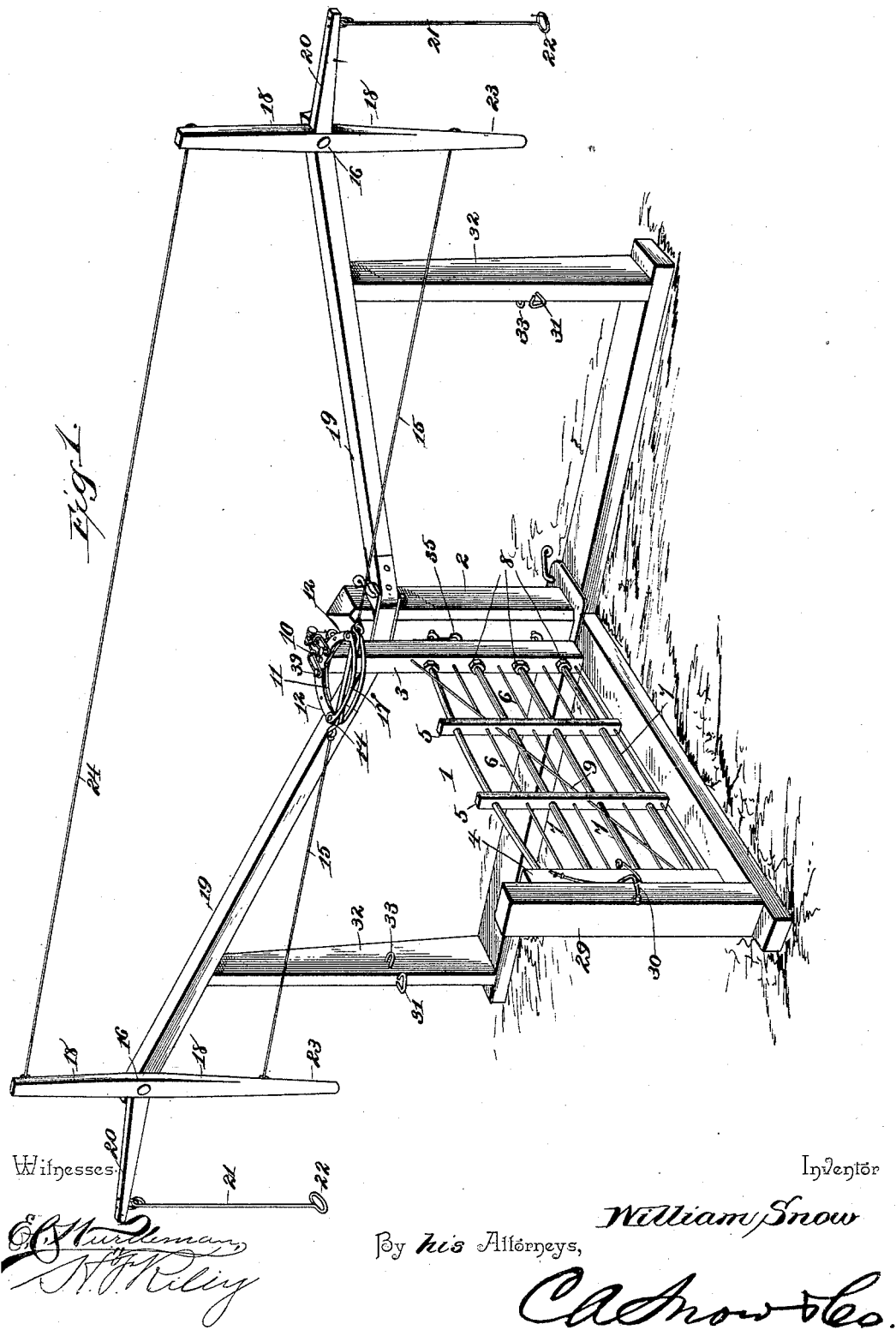
Witnesses Inventor
William Snow
By his Attorneys,

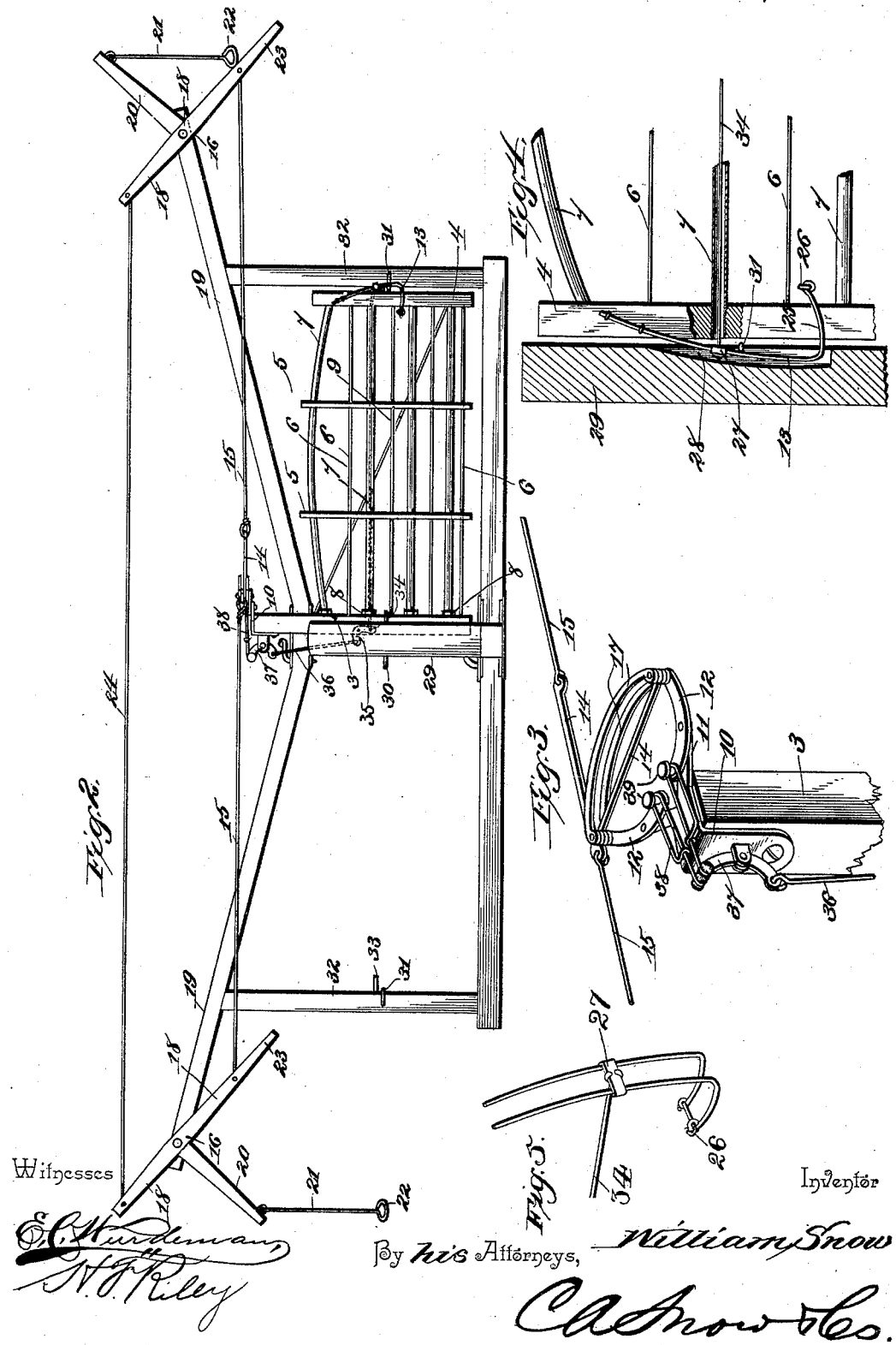

UNITED STATES PATENT OFFICE.

WILLIAM SNOW, OF WAVERLY, ILLINOIS.

SWINGING GATE.

SPECIFICATION forming part of Letters Patent No. 467,443, dated January 19, 1892.

Application filed September 10, 1891. Serial No. 405,295. (No model.)

*To all whom it may concern:*

Be it known that I, WILLIAM SNOW, a citizen of the United States, residing at Waverly, in the county of Morgan and State of Illinois, have invented a new and useful Swinging Gate, of which the following is a specification.

The invention relates to improvements in swinging gates.

The object of the present invention is to simplify and improve the construction of that class of swinging gates which are opened by levers, without dismounting from an animal or leaving a vehicle, and which are similarly closed after passing through the gateway.

The invention consists in the construction and novel combination and arrangement of parts hereinafter fully described, illustrated in the accompanying drawings, and pointed out in the claims hereto appended.

In the drawings, Figure 1 is a perspective view of a swinging gate and means for operating the same, constructed in accordance with this invention, the gate being closed. Fig. 2 is an elevation, the gate being open. Fig. 3 is a detail perspective view. Fig. 4 is a detail sectional view showing the latch. Fig. 5 is a detail perspective view of the latch.

Referring to the accompanying drawings, 1 designates a swinging gate hinged to a post 2, and is composed of end bars 3 and 4, intermediate vertical bars 5, horizontal wires 6, and tubes or pipes 7, which have their ends threaded and provided with nuts 8, adapted to be forced against the end bars to spread the same and tighten the gate. The gate is provided with an inclined bracing-wire 9, is simple, strong, and durable, and does not present a large surface to the wind.

The inner end bar 3 is extended vertically above the gate and has secured to its upper end a Y-shaped plate 10, having its arms 11 extending inwardly over the gate, and fulcrumed on the arms are curved levers 12, which have their inner ends connected with a latch 13 and have their outer ends pivoted to rods 14, which are connected by wires 15 of operating-levers 16. The outer ends of the curved levers 12 are connected by curved guide-bars 17, between which the rods 14 are arranged, and when the wires 15 are pulled upon by the operating-levers the Y-shaped frame is drawn to one side to swing the gate and the curved levers 12 are turned on their pivots to retract the latch to allow the gate to swing.

The operating-levers are T-shaped and their vertical arms 18 extend above and below inclined supporting-bars 19 and their horizontal arms 20 extend outward in the direction of the inclined supporting-bars and have depending from them wires 21, which are provided with handles 22 to enable the levers to be operated by a downward pull. The depending arms of the operating-lever have their lower ends shaped into handles 23 to enable the gate to be opened and closed by a pull or a push. The upper ends of the upper vertical arm 18 are connected by a wire 24, and by this arrangement the operating-levers are rigidly connected with each other and with the gate.

The latch 13 consists of a pair of L-shaped springs extending along the outer end bar 4 and projecting therefrom and having their horizontal short arms 25 extending inward past the end bar and connected by a link 26, and the long approximately-vertical arms are connected by a cross-bar 27. The L-shaped springs engage when the gate is closed a recess 28 of a latch-post 29 and are guided into the recess by angle wires or guides 30, and by employing a pair of springs the gate is enabled to engage the latch-post no matter how swiftly it may be closed. If one of the springs should slip past the latch-post, the other one will be sure to engage the recess. When the gate is open, one of the latch-springs engages a keeper 31 of an upright 32 and is held in engagement with the keeper by a stop 33. The cross-bar 27, which connects the vertical portions of the L-shaped latch-springs, is connected to one end of a wire 34, which passes through one of the tubes or pipes of the gate and has its other end attached to an arm of a bell-crank lever 35, which has its other arm connected by a wire 36 with a bell-crank lever 37. The bell-crank lever 35 is arranged on the inner end post 3 at a point intermediate the ends of the same, and the other bell-crank lever 37 is arranged at the top of the post 3 and has one of its arms connected by loops 38 with the inner ends of the curved levers 12. The loops 38 engage projections 39 of the curved levers and are provided with extensions which are secured to the bell-crank lever 37. By this arrangement a simple and inexpensive gate is produced, which may be easily operated by a person within a vehicle or on a horse without necessitating dismounting, and the vertical arms which extend above the inclined bars enable the gate to be conveniently operated from the top of a load of hay or other elevated position. The ends of the horizontal arms of the L-shaped latch-springs afford convenient means for operating the latch by hand.

What I claim is—

1. The combination, with a swinging gate provided with a spring-actuated latch and having its inner end bar extended vertically, of the curved levers 12, fulcrumed on the upper end of the inner bar 3 and having their inner ends connected with the latch and having their outer ends connected, and the operating-levers connected with the outer ends of the curved levers, substantially as described.

2. The combination of a swinging gate provided with a spring-actuated latch and having its inner end bar extended vertically, the curved levers fulcrumed on the upper end of the inner end bar and having their inner ends connected with the latch and their outer ends connected with each other, the rods pivoted to the ends of the curved levers, and the operating-levers connected with the rods, substantially as described.

3. The combination of a swinging gate provided with a spring-actuated latch, the Y-shaped plate secured to the upper end of the inner end bar and having its arms extending over the gate, the curved levers fulcrumed on the arms and having their inner ends connected with the latch, the guide-rods connecting the outer ends of the levers, the rods 14, pivoted to the outer ends of the levers and arranged between the guide-rods, and the operating-levers connected with the rods 14, substantially as described.

4. The combination of a swinging gate provided with a spring-actuated latch and consisting of the vertical bars, horizontal wires, and the horizontal tubes or pipes, the horizontal wire arranged within one of the tubes or pipes and connected with the latch, the Y-shaped plate secured to the upper end of the inner end bar, the curved levers fulcrumed on the plate and having their outer ends connected and their inner ends provided with projections, the operating-levers connected with the outer ends of the curved levers, the upper and lower bell-crank levers fulcrumed on the inner end bar and connected with each other and with the horizontal wire, and the loops engaging the projections of the curved levers and secured to the upper bell-crank lever, substantially as described.

5. The combination, with a swinging gate provided with a latch comprising the L-shaped springs having their horizontal arms connected and a cross-bar connecting the vertical portions of the springs, of the curved levers fulcrumed on the gate and connected with the latch and the operating-levers connected with the curved levers, substantially as described.

In testimony that I claim the foregoing as my own I have hereto affixed my signature in presence of two witnesses.

WILLIAM SNOW.

Witnesses:
C. C. COURTNEY,
S. L. ROADES.